United States Patent
Kaye

(10) Patent No.: US 9,999,180 B2
(45) Date of Patent: Jun. 19, 2018

(54) TIMBER-WORKING HEAD AND METHOD OF OPERATION

(71) Applicant: Waratah NZ Limited, Tokoroa (NZ)

(72) Inventor: Brett James Kaye, Tauranga (NZ)

(73) Assignee: Waratah NZ Limited, Tokoroa (NZ)

( * ) Notice: Subject to any disclaimer, the term of this patent is extended or adjusted under 35 U.S.C. 154(b) by 1007 days.

(21) Appl. No.: 14/194,314

(22) Filed: Feb. 28, 2014

(65) Prior Publication Data

US 2014/0238544 A1    Aug. 28, 2014

(30) Foreign Application Priority Data

Feb. 28, 2013  (NZ) ........................................ 607713

(51) Int. Cl.
*A01G 23/08* (2006.01)
*A01G 23/083* (2006.01)

(52) U.S. Cl.
CPC .................................. *A01G 23/083* (2013.01)

(58) Field of Classification Search
CPC .... A01G 23/08; A01G 23/081; A01G 23/083; A01G 23/091; A01G 23/093; A01G 23/095
See application file for complete search history.

(56) References Cited

U.S. PATENT DOCUMENTS

| | | | |
|---|---|---|---|
| 6,343,633 B1 | 2/2002 | Larsson | |
| 6,622,761 B1* | 9/2003 | Paakkunainen | A01G 23/095 144/24.13 |
| 6,814,112 B2* | 11/2004 | Johansson | A01G 23/083 144/338 |
| 7,306,018 B2* | 12/2007 | Hicks | A01G 23/081 144/336 |
| 7,874,327 B2* | 1/2011 | Barlow | A01G 23/095 144/4.1 |
| 8,499,803 B2* | 8/2013 | Smythe | A01G 23/095 144/24.13 |
| 2002/0079020 A1 | 6/2002 | Koponen | |
| 2011/0088816 A1* | 4/2011 | Arvidsson | A01G 23/099 144/357 |
| 2011/0265912 A1* | 11/2011 | Arvidsson | A01G 23/083 144/343 |

FOREIGN PATENT DOCUMENTS

NZ    585838    9/2011

OTHER PUBLICATIONS

New Zealand Intellectual Property Office First Examination Report, Application No. 607713, dated Mar. 8, 2013.

* cited by examiner

*Primary Examiner* — Matthew G Katcoff
(74) *Attorney, Agent, or Firm* — Lorenz & Kopf, LLP

(57) ABSTRACT

A timber-working head and method of operation are provided. The head has a frame to which first and second arms are pivotally connected. Respective linear drive actuators pivot the respective arms relative to the frame to open and close them. At least one processor controls application of pressure by the linear drive actuators such that the arms grasp timber to be processed by the head. The position of the linear actuators is used to determine whether the timber is offset from a feed axis of the frame beyond a predetermined distance, and the application of pressure by one of the linear actuators to reduce the offset to be within the predetermined distance.

6 Claims, 4 Drawing Sheets

TIMBER-WORKING HEAD AND METHOD OF OPERATION

CROSS-REFERENCE TO RELATED APPLICATION(S)

This application claims priority under 35 U.S.C. § 119 to New Zealand Patent Application No. 607713, filed Feb. 28, 2013, the entire contents of which are incorporated herein by reference.

STATEMENT OF FEDERALLY SPONSORED RESEARCH OR DEVELOPMENT

Not applicable.

FIELD OF THE DISCLOSURE

The present disclosure relates to a timber-working head, and more particularly to a system and method for controlling pivoting arms of a timber-working head.

BACKGROUND OF THE DISCLOSURE

It is well-known to mount a timber-working head, for example in the form of a harvesting head, to a forestry work machine to perform a number of functions in connection with timber. Such heads may be used to grapple and fell a standing tree and process the felled tree by delimbing, possibly debarking (depending on the configuration of the head), and cutting the stem of the tree into logs of predetermined length.

Processing the felled tree typically involves feeding the resulting stem along its length relative to the head using a feed mechanism. One well known system uses arm mounted hydraulic rotary drives having a feed wheel at the end of each arm. The arms may be driven by hydraulic cylinders to pivot relative to the frame of the head in order to grapple the stem with the feed wheels, which may then be driven in the desired direction. In order to ensure that the stem is firmly grasped in the desired centre position, a mechanical link between the arms is used so they open and close together.

However, the stems processed by the harvester head may be ill-formed, for example having sweep (i.e. variation in the axial linearity of the stem) or other contour irregularities (e.g. bulges, depressions, lack of circularity). In such cases the fixed relationship of the arms relative to each other means that one feed wheel may have a different degree of contact with the stem surface than the other, impacting on traction. This can cause hydraulic oil to bypass, leading to one wheel slipping and spinning—causing less than optimal feed performance and potentially damage to the stem by the slipping wheel ripping into the surface. There can also be further ramifications in terms of damage to the motors themselves as the result of this slipping and motor cavitation.

The mechanical link also adds weight and complexity to the harvester—particularly in the steel support frame and pins required for pivotal connection—which in turns adds to the cost of manufacture. These also create potential points of mechanical failure, particularly where ill-formed stems lead to an imbalance of forces being applied to the two arms—essentially attempting to rip them apart. As the operation of the feed arms is a crucial component of many, if not all, of the functions of a harvester head, time required to repair the link may reduce the productivity of the forestry work machine.

All references, including any patents or patent applications, cited in this specification are hereby incorporated by reference. No admission is made that any reference constitutes prior art. The discussion of the reference states what their authors assert, and the applicants reserve the right to challenge the accuracy and pertinence of the cited documents. It will be clearly understood that, although a number of prior art publications are referred to herein, this reference does not constitute an admission that any of these documents forms parts of the common general knowledge in the art, in New Zealand or in any other country.

Throughout this specification, the word "comprise" or "include", or variations thereof such as "comprises", "includes", "comprising", or "including" will be understood to imply the inclusion of a stated element, integer or step, or group of elements integers or steps, but not the exclusion of any other element, integer or step, or group of elements, integers or steps.

Further aspects and advantages of the present disclosure will become apparent from the ensuing description which is given by way of example only.

SUMMARY OF THE DISCLOSURE

According to an embodiment of the present disclosure there is provided a timber-working head. The head may comprise a frame. A first arm and a second arm may be pivotally connected to the frame, wherein pivotal movement of the first arm is mechanically independent to pivotal movement of the second arm. A first linear drive actuator may be connected to the first arm, and a second linear drive actuator may be connected to the second arm. The linear actuators may be configured to pivot the respective arms relative to the frame to open and close them.

According to another embodiment of the present disclosure there is provided a timber-working head. The head may comprise a frame. A first arm and a second arm may be pivotally connected to the frame. A first linear drive actuator may be connected to the first arm, and a second linear drive actuator may be connected to the second arm. The linear actuators may be configured to pivot the respective arms relative to the frame to open and close them. At least one processor may be configured to control application of pressure by the first and second linear drive actuators such that the arms grasp timber to be processed by the head. The at least one processor may determine whether the position of the linear actuators indicates that the timber is offset from a feed axis of the frame beyond a predetermined distance. The at least one processor may control application of pressure by either the first linear actuator or the second linear actuator to reduce the offset to be within the predetermined distance.

According to another embodiment of the present disclosure there is provided a method of operating a timber-working head comprising a frame, a first arm and a second arm pivotally connected to the frame, and a first linear drive actuator connected to the first arm, and a second linear drive actuator connected to the second arm. The method may comprise applying pressure by the first and second linear drive actuators such that the arms grasp timber to be processed by the head. It may be determined whether the position of the linear actuators indicates that the timber is offset from a feed axis of the frame beyond a predetermined distance. Pressure applied by either the first linear actuator or the second linear actuator may be controlled to reduce the offset to be within the predetermined distance.

According to an exemplary embodiment of the disclosure there is provided an electronic control device for a timber-working head comprising a frame, a first arm and a second arm pivotally connected to the frame, and a first linear drive actuator connected to the first arm, and a second linear drive actuator connected to the second arm. The control device may comprise at least one processor configured to control application of pressure by the first and second linear drive actuators such that the arms grasp timber to be processed by the head. The at least one processor may determine whether the position of the linear actuators indicates that the timber is offset from a feed axis of the frame beyond a predetermined distance. The at least one processor may control application of pressure by either the first linear actuator or the second linear actuator to reduce the offset to be within the predetermined distance.

According to another exemplary embodiment there is provided an article of manufacture having computer storage medium storing computer readable program code executable by a computer to implement a method for operating a timber-working head comprising a frame, a first arm and a second arm pivotally connected to the frame, and a first linear drive actuator connected to the first arm, and a second linear drive actuator connected to the second arm. The code may comprise computer readable program code applying pressure to the first and second linear drive actuators such that the arms grasp timber to be processed by the head. The code may comprise computer readable program code determining whether the position of the linear actuators indicates that the timber is offset from a feed axis of the frame beyond a predetermined distance. The code may comprise computer readable program code controlling pressure applied to either the first linear actuator or the second linear actuator to reduce the offset to be within the predetermined distance.

In an exemplary embodiment the timber-working head may a harvester head, and may be referred to as such throughout the specification. Harvester heads typically have the capacity to grapple and fell a standing tree, delimb and/or debark a felled stem, and cut the stem into logs. However, a person skilled in the art should appreciate that the present disclosure may be used with other timber-working heads, for example a feller buncher, debarking and/or delimbing head, disc saw head, saw grapple, and so on—and that reference to the timber-working head being a harvester head is not intended to be limiting.

As such, in an exemplary embodiment the arms may be feed arms, each comprising a feed wheel configured to be brought in contact with timber. The feed wheels may each be connected to a rotary drive such that they may be used to feed the timber along a feed axis of the head. However, it should be appreciated that the present disclosure may be applied to other arms of the timber-working head, for example delimb arms.

In an exemplary embodiment, pivotal movement of the first arm may be mechanically independent to pivotal movement of the second arm. Reference to the pivotal movement of the arms being mechanically independent should be understood to mean the absence of a physical link causing one arm to pivot relative to the frame when corresponding pivotal movement of the other arm occurs. It may be said that the arms can pivot independent of one another, although it should be appreciated that control of each arm may be influenced by movement of the other.

In an exemplary embodiment the linear drive actuators may be hydraulically driven. Reference will herein be made throughout the specification to the linear actuator being a hydraulic cylinder, however is should be appreciated that other actuator types—for example electric or pneumatic—may be used in embodiments of the disclosure.

In an exemplary embodiment each of the first and second drive cylinders may be configured to output a signal indicative of the position of the cylinder. Reference to the position of the cylinder should be understood to mean the position of a point on the cylinder which may be used to determine the degree to which the cylinder is extended. For example, the cylinder may comprise a linear position sensor. Various technologies for sensing linear position are known in the art—for example operating using magnetostrictive principles, or Hall-Effect.

In an exemplary embodiment the timber-working head may comprise a controller configured to control operation of the first and second cylinders. In particular, it is envisaged that the controller may be configured to control pressure applied by the first and second linear actuators.

The controller may be configured to initially control pressure applied by the first and second linear actuators to be equal on receiving a command signal from an operator to close the arms. In doing so, it is envisaged that the arms may "float"—pressing against the surface of the timber, but being permitted to independently move inwardly or outwardly to maintain contact with the surface to account for irregularities which may be unequal between the sides of the timber.

The controller may be configured to control operation of the cylinders based on their respective positions. In an exemplary embodiment it is envisaged that the controller may be configured to control the pressure applied by one of the cylinders based on the position of the linear actuators indicating that a stem held between the arms is offset from a feed axis of the frame beyond a predetermined distance.

While it may be useful to allow independent movement of the arms to allow for irregularities in the profile of the timber, it may also be desirable to maintain the lateral position of the stem within certain limits relative to the feed axis of the timber-working head. In particular, it may be desirable for the stem to be held roughly centre in order to align it with delimbing blades, and maintain maximum traction by the feed wheels. Further, it may be desirable for the stem to be held such the saw may perform a cut at a substantially 90 degree angle. As the length measurement is taken from the shortest side of a cut log, achieving a square cut may assist in maximizing the value of the log cut.

It should be appreciated that the predetermined distance may vary between different configurations of timber-working heads, particularly with regard to the dimensions of the heads themselves and the diameter of timber expected to be processed. Movement of the stem may generally limited by the harvester body itself. Control of the travel within this may account for maintaining a minimum gap between the harvester and the stem to reduce the likelihood of the stem grating against the side and potentially causing damage to the stem and/or harvester. Variation in the stem due to sweep or other contour irregularities may also be taken into consideration.

In an exemplary embodiment the controller may be that used to control other functions of the timber-working head. However, it should be appreciated that the controller may be one dedicated to performance of the present disclosure and in communication with a control module configured to control general operation of the head.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The various illustrative logical blocks, modules, circuits, and algorithm steps described in connection with the embodiments disclosed herein may be implemented by a programmed processor executing instructions stored in memory. The functions, acts or tasks are independent of the particular type of instructions set, storage media, processor or processing strategy and may be performed by software, hardware, integrated circuits, firm-ware, micro-code and the like, operating alone or in combination.

The memory may comprise computer-readable media. The term "computer-readable medium" may comprise a single medium or multiple media, such as a centralized or distributed database, and/or associated caches and servers that store one or more sets of instructions. The term "computer-readable medium" may also comprise any medium that is capable of storing, encoding or carrying a set of instructions for execution by a processor or that cause a computer system to perform any one or more of the methods or operations disclosed herein. The "computer-readable medium" may be non-transitory, and may be tangible.

It should be appreciated that in exemplary embodiments one or more dedicated hardware implementations, such as application specific integrated circuits, programmable logic arrays and other hardware devices, can be constructed to implement one or more of the methods described herein. One or more embodiments described herein may implement functions using two or more specific interconnected hardware modules or devices with related control and data signals that can be communicated between and through the modules, or as portions of an application-specific integrated circuit.

BRIEF DESCRIPTION OF THE DRAWINGS

Embodiments of the present disclosure may be better understood with reference to the following description and accompanying drawings, which are given by way of example only.

DETAILED DESCRIPTION

Figure 1:
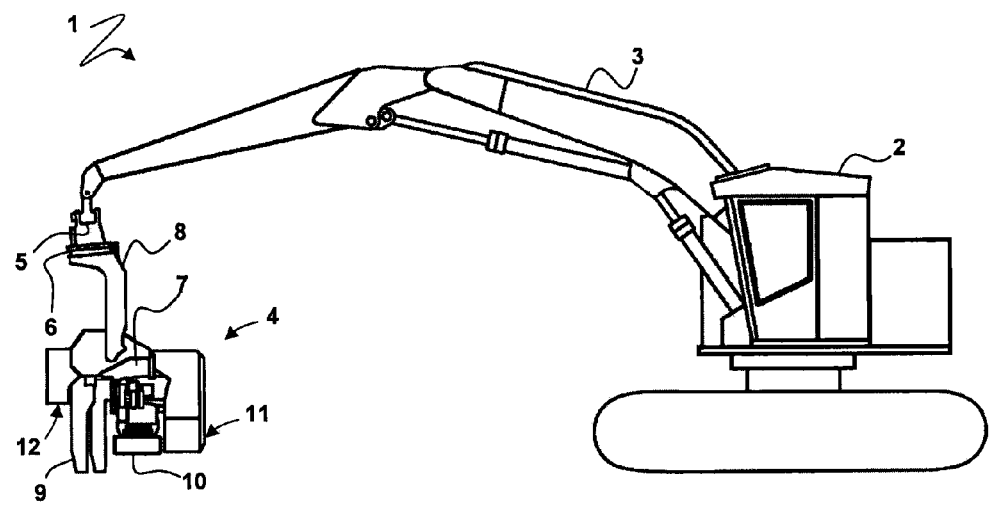
FIG. 1 is a side view of an exemplary forestry work machine comprising an exemplary timber-working head according to one embodiment of the present disclosure.

FIG. 1 illustrates an exemplary forestry work machine (generally indicated by arrow 1) comprising a carrier 2 supporting an articulated boom 3. An exemplary timber working implement in the form of a harvester head 4 is connected to an end of the boom 3, using a dog-bone joint 5 connected to a rotator 6, which is in turn connected to a frame 7 of the head 4 by hanger 8. In operation, the head 4 may swivel relative to the end of the boom 3 about the rotator 6, and pivotally move about its connection to the hanger 8 between a generally upright, harvesting position for felling a tree (not illustrated) and a generally prone, processing position (as illustrated) for processing the felled tree (e.g., delimbing, debarking, cutting to length).

The harvester head 4 comprises a pair of grapple or delimbing arms 9 pivotally connected to the frame 7 and configured to grasp the stem of the tree. The head 4 also comprises a pair of feed arms 10 pivotally connected to the frame 7 and comprising feed wheels configured to control the longitudinal position of the tree relative to the head 4. The harvester head 4 also comprises a main chain saw at the end marked by arrow 11, and a topping chain saw at the end marked by arrow 12.

The machine 1, particularly harvester head 4, may be controlled by an operator (not illustrated) using hand and foot controls as known in the art. A controller (such as that described with reference to FIG. 4) controls operation of the harvester head 4 in response to data or signals received from various components of the harvester head 4 and in conjunction with the operator input devices.

Figure 2:
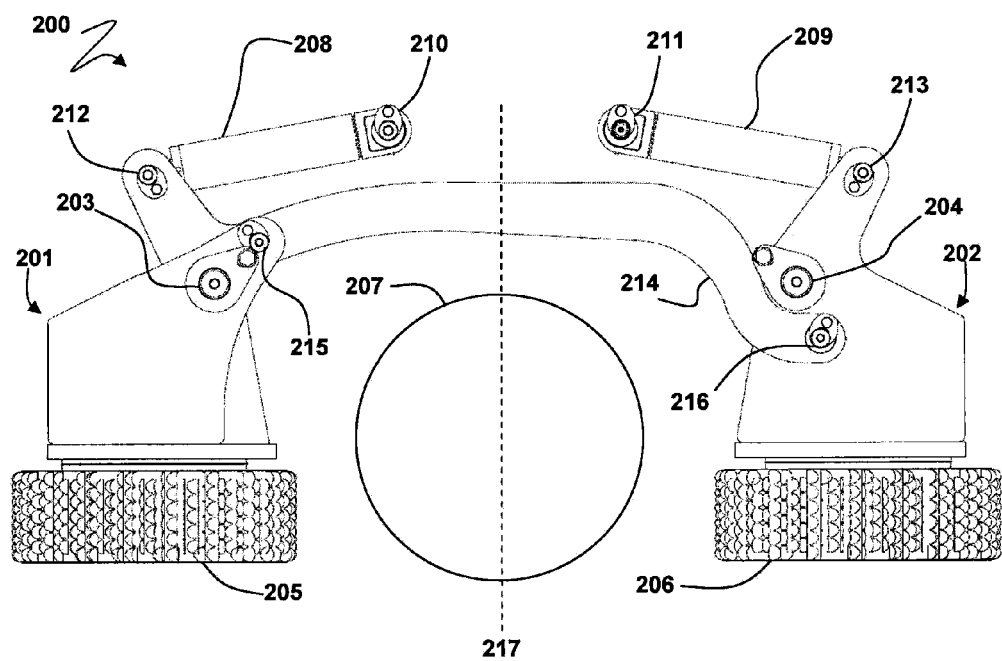
FIG. 2 is an end perspective view of a prior art feed arm system.

FIG. 2 illustrates a prior art feed arm system 200 for a harvester head (such as harvester head 4 illustrated in FIG. 1). The system 200 comprises a left-hand (LH) feed arm 201 and a right-hand (RH) feed arm 202. The feed arms 201, 202 are pivotally connected to the frame (not illustrated) by pins 203 and 204 respectively, such that the arms 201, 202 may be rotated to bring feed wheels 205 and 206 into contact with a tree stem 207.

Movement of the arms 201, 202 is driven by hydraulic cylinders 208 and 209 respectively. Each cylinder 208, 209 is connected to the frame by pins 210 and 211 respectively, and the arms 201, 202 by pins 212 and 213 respectively.

The arms 201, 202 are mechanically connected by a timing link 214 between LH ear 215 and RH pin 216. The arms 201, 202 cannot rotate about pins 203, 204 without affecting movement of the other arm due to the timing link 214. The timing link 214 means that any movement by LH arm 201 towards or away from vertical centerline 217 will encourage the mirror movement by RH arm 202. As such, where the stem 207 is irregular in profile, one feed wheel 205, 206 will have greater contact with the stem 207 than the other. This unequal application of force may shift the stem away from the feed axis (not illustrated, but perpendicular to vertical centerline 217) of the harvester head.

Figure 3:
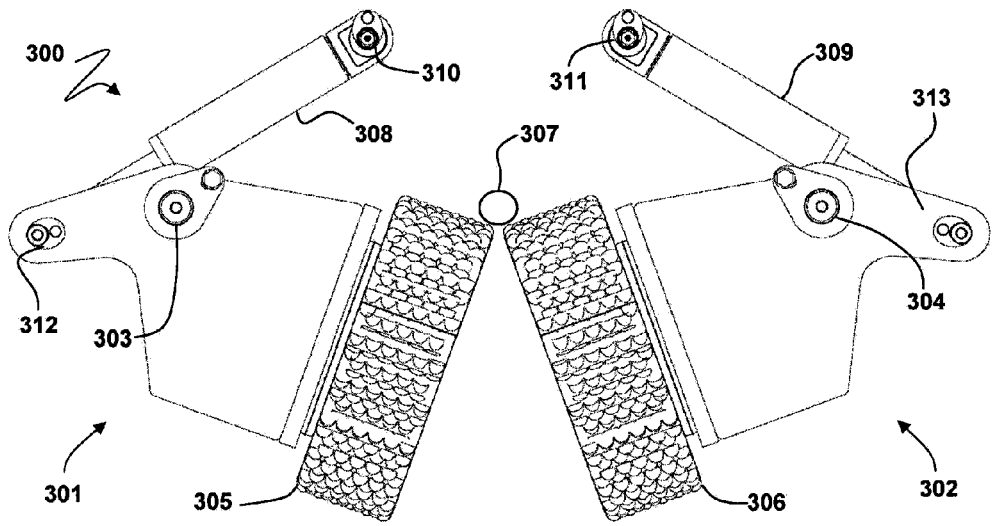
FIG. 3 is an end perspective view of an exemplary feed arm system.

FIG. 3 illustrates an exemplary feed arm system 300 according to one aspect of the present disclosure. The system 300 comprises a left-hand (LH) feed arm 301 and a right-hand (RH) feed arm 302. The feed arms 301, 302 are pivotally connected to the frame (not illustrated) by pins 303 and 304 respectively, such that the arms 301, 302 may be rotated to bring feed wheels 305 and 306 into contact with a tree stem 307.

Movement of the arms 301, 302 is driven by LH and RH hydraulic cylinders 308 and 309 respectively. Each cylinder 308, 309 is connected to the frame by pins 310 and 311 respectively, and the arms 301, 302 by pins 312 and 313 respectively. Extension and retraction of the cylinders 308, 309 through the control of hydraulic pressure supplied to the respective cylinders 308, 309 pivots the arms 301, 302 about pins 312, 313. The cylinders 308, 309 are each configured to output a signal indicating the position of each cylinder in terms of its extension.

The pivotal movement of each of the arms 301, 302 is mechanically independent to that of the other arm 301, 302. Unlike the prior art feed arm system 200, there is no timing link connecting the arms 301, 302 to prevent independent rotation about pins 303, 304 without affecting movement of the other arm due to the timing link 214.

Figure 4:
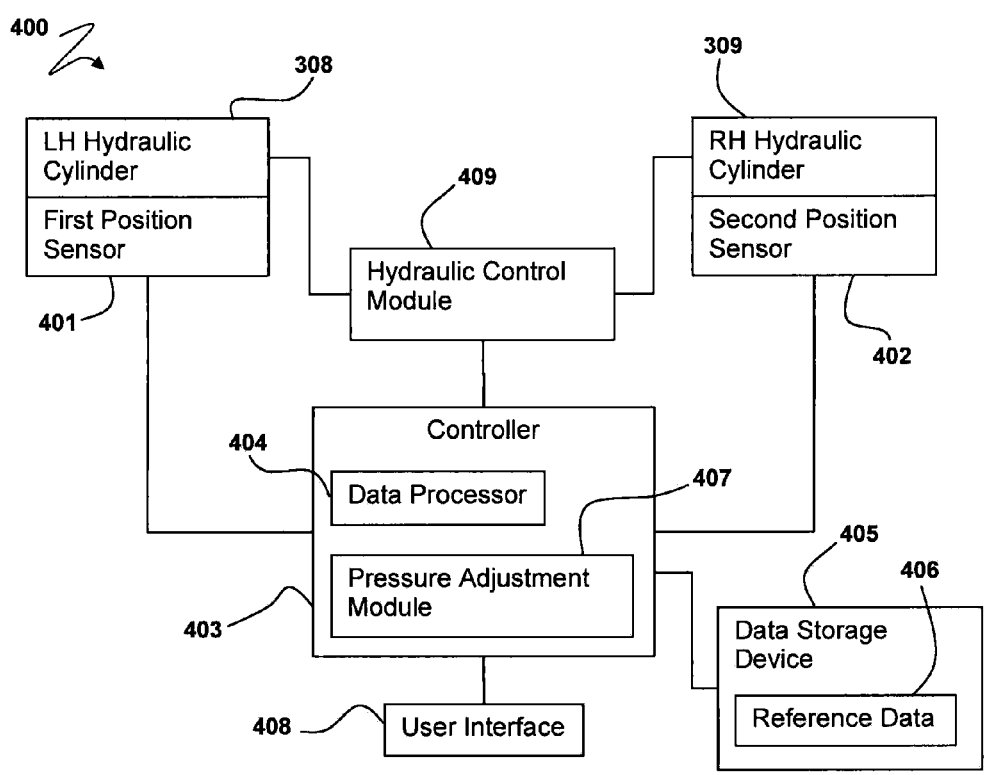
FIG. 4 is a block diagram of an exemplary control system for controlling operation of an exemplary timber-working head.

FIG. 4 illustrates an exemplary control system 400 for feed arm system 300. The control system comprises a first position sensor 401 and a second position sensor 402 associated with hydraulic cylinders 308 and 309 respectively. These sensors 401, 402 are configured to output a signal indicative of the position, or extension of the cylinders 308, 309. It should be appreciated that the sensors 401, 402 may be integrated into the structure of the cylinders 308, 309, whether internally or externally.

The signals are communicated to a controller 403. The controller 403 comprises a data processor 404 which may access a look-up table, or apply an algorithm, to determine the respective positions of the cylinders 308, 309 from the signals. The controller 403 is also in communication with a data storage device 405 and manages the storage, retrieval or access of reference data 406 stored thereon. A pressure adjustment module 407 of the controller 403 may respond to position data received from the cylinders 308, 309 to control their operation, as will be described further below with reference to FIG. 6. It should be appreciated that reference to the controller 403 performing certain tasks may comprise those performed by the processor 404 and/or pressure adjustment module 407.

A hydraulic control module 409 is in communication with the controller 403, and is configured to control the delivery of hydraulic fluid to the cylinders 308, 309. It should be appreciated that the hydraulic control module 409 may comprise any suitable means known in the art for controlling hydraulic fluid flow, for example solenoids, relays, servomotors in combination with some form of valve. The hydraulic control module 409 may be a centralized unit, or comprise components located at the cylinders 308, 309 themselves. It should be appreciated that reference to the controller 403 controlling operation of the cylinders 308, 309 may comprise operations performed by the hydraulic control module 409, although explicit reference to this may not be made.

The controller 403 is also in communication with a user interface 408. The user interface 408 may comprise a number of user input devices such as hand and foot controls and a touch screen as known in the art for controlling operation of a timber-working head comprising the feed arm system 300. It should be appreciated that while the exemplary controller 403 is illustrated as a single device, this is not intended to be limiting and the functions described may be shared over multiple devices—for example, a first controller associated with the vehicle to which the head is connected, communicating with a second controller associated with the head over a communications bus.

Figure 5:
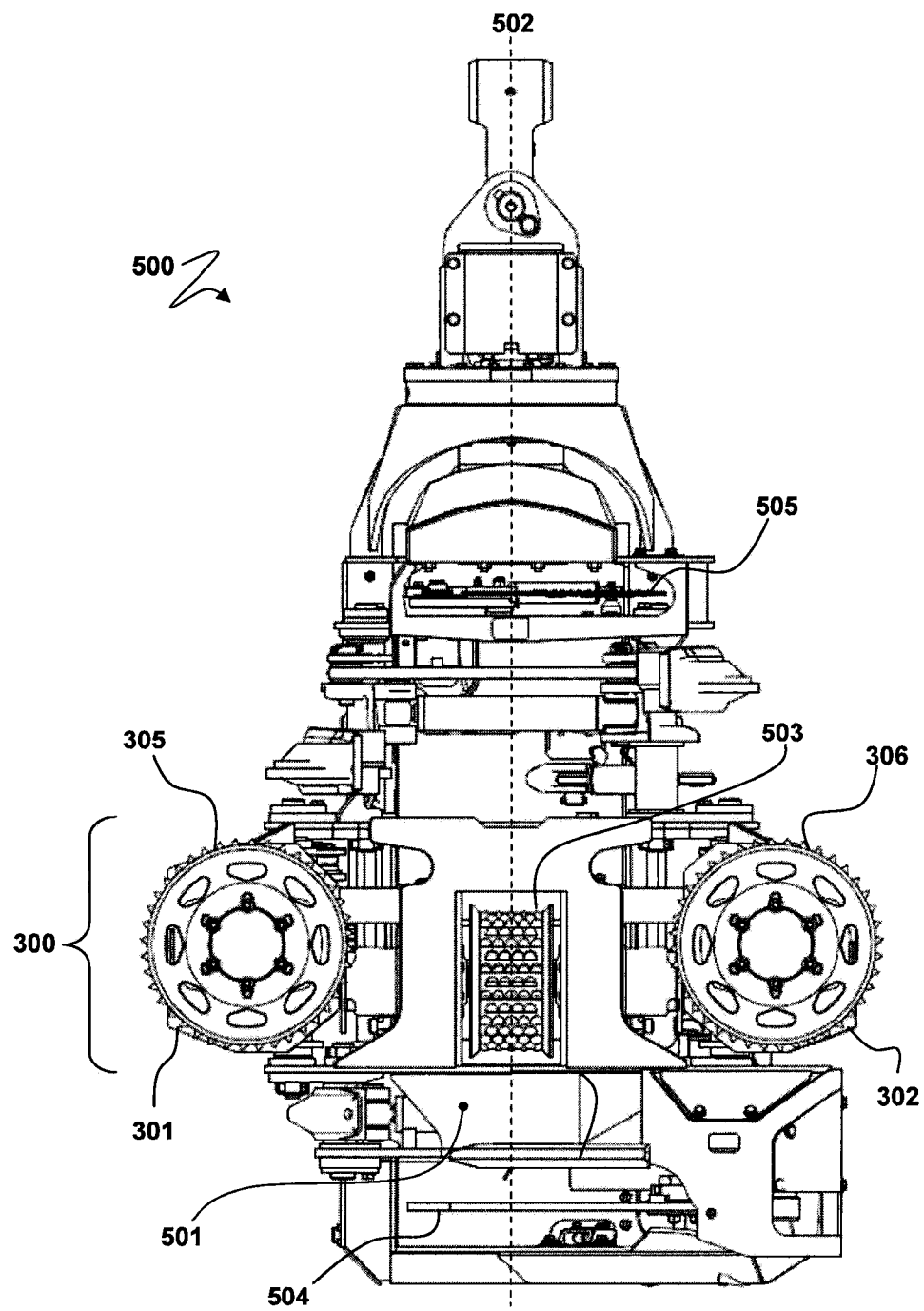
FIG. 5 is a front elevation view of an exemplary timber-working head.

Referring to FIG. 5, the feed arm system 300 is illustrated in the context of an exemplary timber-working head in the form of harvester head 500, having a frame 501 to which the feed arm system 300 is connected. The pressure of cylinders (not illustrated) may be independently controlled to have the feed wheels 305, 306 maintain contact with a stem (not illustrated) held between them, while maintaining a desired lateral position of the stem relative to feed axis 502 of the head 500. Along the feed axis 502 the head 500 comprises a drive wheel 503 for use in feeding the stem along the feed axis 502, and a toothed measuring wheel (not illustrated) used to measure the length of the stem and its position relative to the head 500 (in particular main chainsaw 504 and topping saw 505).

Figure 6:
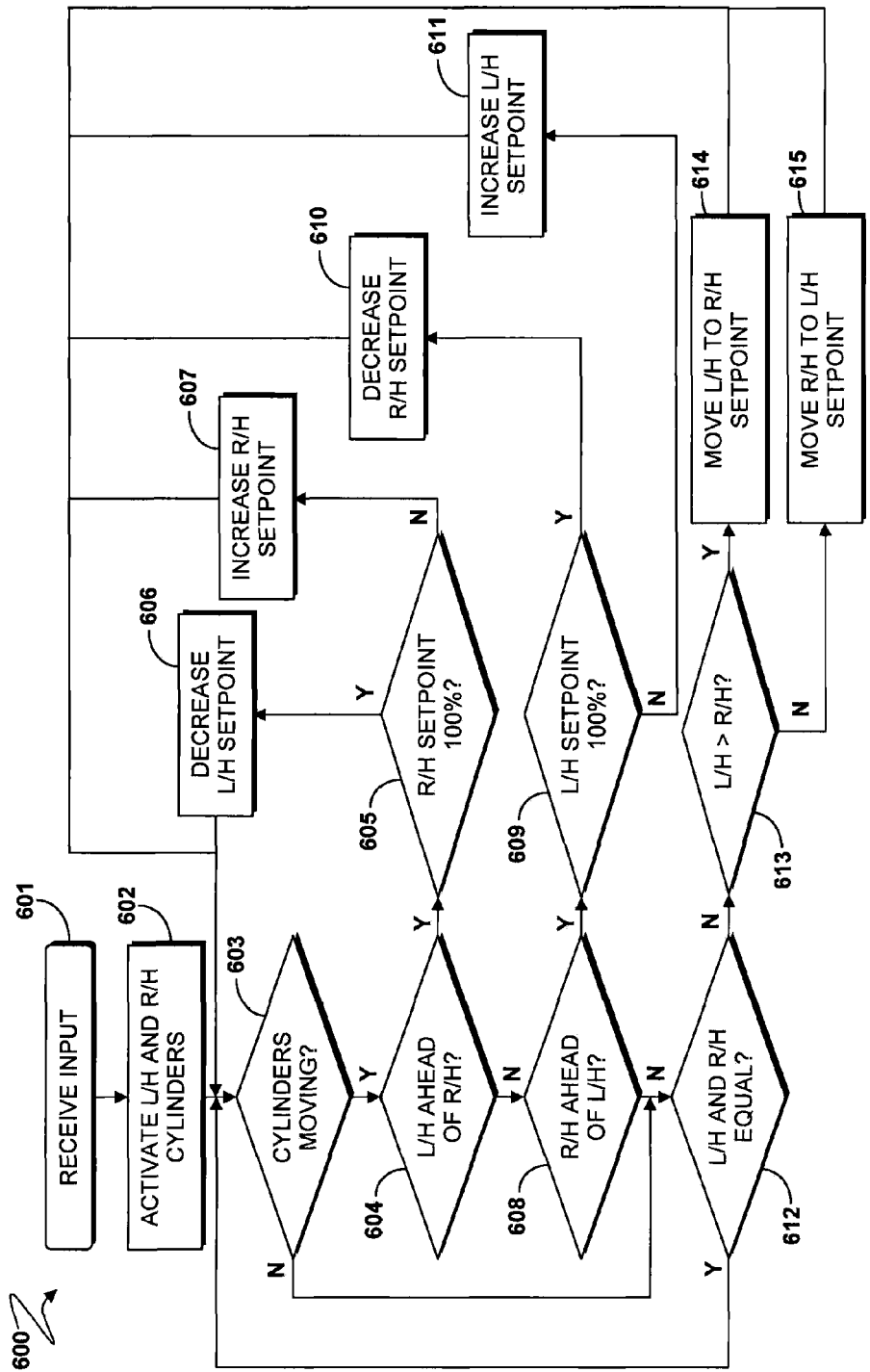
FIG. 6 is a flow diagram illustrating an exemplary method of controlling an exemplary timber-working head.

FIG. 6 illustrates an exemplary method 600 by which operation of harvester head 500, and in particular feed arm system 300, may be controlled.

In step 601, the controller 403 receives a command from user interface 408 to activate the feed arm system 300 to cause a stem to be grasped by the feed arms 301, 302.

In step 602 the controller 403 causes equal hydraulic pressure to be applied to both cylinders 308, 309, in turn causing the feed arms 301, 302 to pivot inwardly.

In step 603 the controller 403 receives signals from the position sensors 401, 402 and processes these in combination with previously stored position data to determine whether either or both of the cylinders 308, 309 are currently moving. If there is movement, the method proceeds to step 604, otherwise the method continues with step 612.

In step 604, the controller 403 determines whether the position of the LH cylinder 301 is ahead of the position of the RH cylinder 302 by a distance greater than a predetermined value, for example 10 mm. It should be appreciated that this value may be dependent on a number of factors, for example the dimensions of various components of the head 500 comprising the saws 505 and 506.

If the LH cylinder 301 is ahead of the RH cylinder 302 beyond the predetermined distance, this indicates that the stem being processed is off centre from the feed axis 502 to an undesired extent, and the method proceeds to step 605. If not, the method continues with step 608. In step 605, the controller 403 determines whether the pressure set point of the RH cylinder 309 is at a maximum. If so, the set point of the LH cylinder 308 is reduced in step 606, and the resulting reduced pressure differential with the RH cylinder 309 causes the RH feed arm 302 to act against the stem to bring it closer to the feed axis 502. If the pressure set point of the RH cylinder 309 is not at maximum, the set point of the RH cylinder 309 is increased in step 607 to achieve the same effect. It should be appreciated that control loop feedback, such as PID control, may be used to ramp the accelerations or decelerations for each arm.

Once steps 606 or 607 have been performed, the method may return to step 603—unless interrupted by a command received from the operator to release the stem.

In step 608, a similar routine is followed if the RH cylinder 309 is ahead of the LH cylinder 308 is beyond the predetermined distance, and the method proceeds to step 609. If not, the method continues with step 612. In step 609, the controller 403 determines whether the pressure set point of the LH cylinder 308 is at a maximum. If so, the set point of the RH cylinder 309 is reduced in step 610, and the resulting reduced pressure differential with the LH cylinder 308 causes the LH feed arm 301 to act against the stem to bring it closer to the feed axis 502. If the pressure set point of the LH cylinder 308 is not at maximum, the set point of the LH cylinder 308 is increased in step 611 to achieve the same effect. Once steps 610 or 611 have been performed, the method may return to step 603—unless interrupted by a command received from the operator to release the stem.

If no movement is detected in step 603, or if the RH cylinder 309 is not ahead of the LH cylinder 308 by the predetermined distance, the method continues in step 612 where the controller 403 determines whether the pressure set point of each cylinder 308, 309 is equal. If they are, the method returns to step 603—unless interrupted by a command received from the operator to release the stem.

If the set points are not the same, in step 613 the controller 403 determines whether the LH cylinder 308 set point is greater than the RH cylinder 309 set point. If it is the method proceeds to step 614, where the LH cylinder 308 set point is adjusted to be the same as the RH cylinder 309 set point. Conversely, if the LH cylinder 308 set point is less than the RH cylinder 309 set point the method proceeds to step 615, where the RH cylinder 309 set point is adjusted to be the same as the LH cylinder 308 set point. Once steps 614 or 615 have been performed, the method returns to step 603—unless interrupted by a command received from the operator to release the stem.

Aspects of the present disclosure have been described by way of example only and it should be appreciated that modifications and additions may be made thereto without departing from the scope thereof as defined in the appended claims.

What is claimed is:

1. A method of operating a timber-working head, the timber-working head including a frame having a feed axis between a first side of the frame and a second side of the frame, a first arm at the first side of the frame and a second arm at the second side, the first and second arms pivotally connected to the frame, a first linear drive actuator connected to the first arm, and a second linear drive actuator connected to the second arm, wherein the linear actuators are configured to pivot the respective arms relative to the frame to open and close them, and at least one processor, the method of operating the timber-working head comprising:
   controlling application of pressure by the first and second linear drive actuators such that the arms grasp timber to be processed by the head;
   determining whether the position of the linear actuators indicates that the timber is offset from the feed axis of the frame beyond a predetermined distance; and
   independently controlling application of pressure by either the first linear actuator or the second linear actuator to reduce the offset to be within the predetermined distance.

2. A method as claimed in claim 1, wherein each of the first and second drive linear actuators is configured to output a signal indicative of the position of the respective linear actuators to the processor.

3. A method as claimed in claim 1, wherein the processor is configured to initially control pressure applied by the first and second linear actuators to be equal.

4. A method as claimed in claim 1, wherein the first arm and second arm each comprise a feed wheel.

5. A method of operating a timber-working head comprising a frame having a feed axis between a first side of the frame and a second side of the frame, a first arm at the first side of the frame and a second arm at the second side of the frame, the first and second arms being pivotally connected to the frame, and a first linear drive actuator connected to the first arm, and a second linear drive actuator connected to the second arm, the method comprising:
   applying pressure by the first and second linear drive actuators such that the arms grasp timber to be processed by the head;
   determining whether the position of the linear actuators indicates that the timber is offset from the feed axis of the frame closer to one of the first side of the frame and the second side of the frame beyond a predetermined distance; and
   independently controlling pressure applied by either the first linear actuator or the second linear actuator to reduce the offset to be within the predetermined distance.

6. A method as claimed in claim 5, wherein equal pressure is initially applied by the first and second linear actuators.

* * * * *